United States Patent [19] [11] 4,334,298
Asada [45] Jun. 8, 1982

[54] WIRELESS SPEECH-SYNTHESIZER TIMEPIECE

[75] Inventor: Atsushi Asada, Nara, Japan

[73] Assignee: Sharp Kabushiki Kaisha, Osaka, Japan

[21] Appl. No.: 127,849

[22] Filed: Mar. 6, 1980

[30] Foreign Application Priority Data

Mar. 9, 1979 [JP] Japan ............................ 54-30728[U]

[51] Int. Cl.³ ......................... G04B 21/08; H04M 1/00
[52] U.S. Cl. .................................. 368/63; 179/1 SM
[58] Field of Search ..................... 368/47, 53, 63, 245, 368/69, 250, 251; 340/694, 147 R; 179/1 SA, 1 SM

[56] References Cited

U.S. PATENT DOCUMENTS 3,998,045 12/1976 Lester .................................. 368/63
4,045,777 8/1977 Mierzwinski et al. .............. 340/694
4,187,518 2/1980 Martin et al. ......................... 368/47

*Primary Examiner*—Vit W. Miska
*Attorney, Agent, or Firm*—Birch, Stewart, Kolasch & Birch

[57] ABSTRACT

A wireless speech-synthesizer timepiece is adapted to provide an audible readout of updated time from any location remote from the body of the timepiece in a wireless fashion. The timepiece includes a transmitter having a light emitting diode at a location remote from the body of the timepiece and a receiver built in the body of the timepiece and having a light sensitive means responsive to the light liberated from the light transmitter.

1 Claim, 1 Drawing Figure

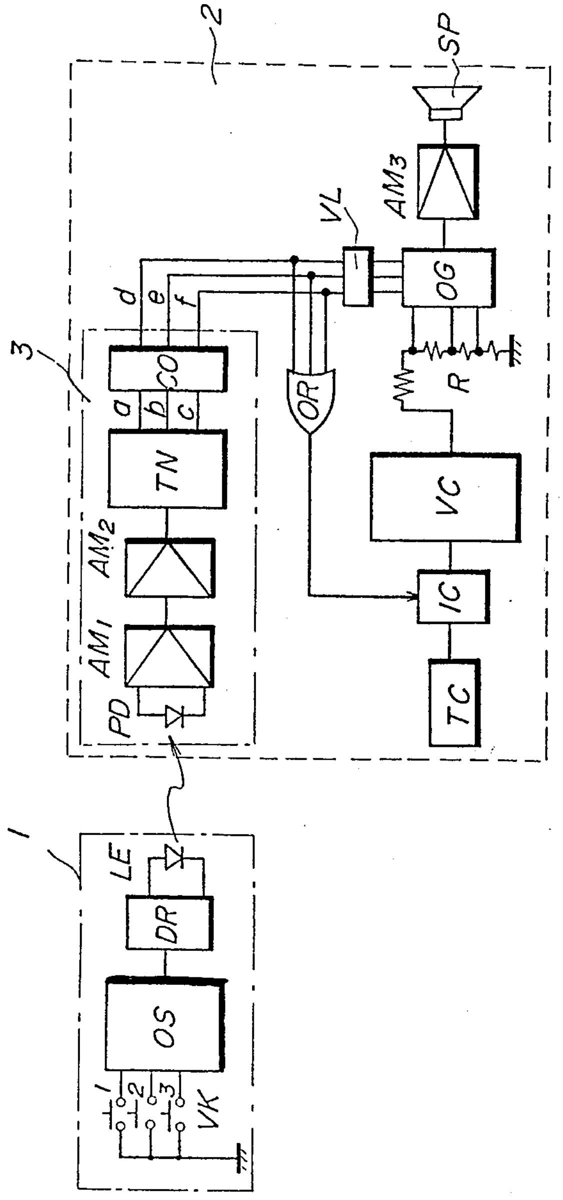
2
3
1
SP
AM3
VL
OG
d
e
f
CO
a
b
c
TN
AM2
AM1
PD
OR
R
VC
IC
TC
LE
DR
OS
1
2
3
VK

WIRELESS SPEECH-SYNTHESIZER TIMEPIECE

BACKGROUND OF THE INVENTION

This invention relates to a wireless speech-synthesizer timepiece capable of providing an audible readout of updated time from any location remote from the body of the timepiece in a wireless fashion.

Numerous and manifold approaches have been suggested for various types of timepieces such as desk-top clocks, wall clocks, wristwatches and pendant watches. The desk-top clock and wall clock are more convenient than the remaining types of timepieces in that a unlimited number of persons are able to look at a visual display of updated or real time thereon. However, in the event that these timepieces are opposite the viewing sense of the viewer or reflect light beams from a fluorescent lamp and the like. It is difficult to learn the updated time even from the desk-top clock and wall clock.

OBJECTS AND SUMMARY OF THE INVENTION

Accordingly, it is an object of the present invention to provide a highly useful speech-synthesizer timepiece using a wireless switch for announcing the updated time in the form of audible synthesized sounds whenever desired.

Another object of the present invention is to provide an improved speech-synthesizer timepiece which may control the volume of audible synthesized sounds in a wireless fashion.

Briefly, in accordance with the present invention, a speech-synthesizer timepiece is provided which comprises means for keeping time, means for announcing in the form of audible synthesized sounds updated time information stored within said timekeeping means and means for directing said announcing means to operate from a location remote from the body of said timepiece in a wireless fashion. The directing means may further include means for controlling the volume of the audible synthesized sounds.

BRIEF DESCRIPTION OF THE DRAWINGS

The foregoing as well as other objects, features and advantages of the present invention will become more readily appreciated upon the consideration of the following detailed description of the illustrated embodiments, together with the accomanying drawings, wherein:

The single drawing is a schematic block diagram of one preferred embodiment of the present invention.

DETAILED DESCRIPTION OF THE ILLUSTRATED EMBODIMENTS

Referring now to the accompanying drawing, there is illustrated one preferred embodiment of the present invention which includes a transmitter 1 and a timepiece body 2 having a built-in receiver 3. The transmitter 1 carries three time recall keys $VK_1$-$VK_3$ each selecting the volume of audible outputs at a desired level of three levels; high, intermediate and low. A rectangular waveform oscillator OS provides different frequency outputs in response to actuation of the respective time recall keys $VK_1$-$VK_3$, thus enabling an infrared light emitting diode LE via a driver DR. In other words, the infrared light emitting diode LE will emit light at different frequencies, depending on actuation of the respective time recall keys $VK_1$-$VK_3$.

A photodiode PD in the built-in receiver 3 within the timepiece body 2 senses the infrared light emitted from the transmitter 1 and the next succeeding amplifiers $AM_1$ and $AM_2$ amplify that reception signal to an appropriate level. A tuning circuit TN is adapted to provide a frequency signal tuned to the reception signal for any of three signal lines a, b and c and, if the tuned frequency signal is present, feed a high level signal (logic "1") to the corresponding one of signal lines d, e and f through a converter CO. In the absence of the corresponding frequency signal the signal lines remain held at a low level (logic "0").

A timekeeping circuit TC updates current time from time to time and enables an input control circuit IC via a logic OR gate OR as long as a high level signal is developed at any of the signal lines d, e and f in the converter CO. Accordingly, the current time information is transferred from the timekeeping circuit TC into an audible output control circuit VC which in turn delivers a sequence of audible signals indicative of the contents of the current or updated time information. One way of converting the updated time information into the audible signals is fully shown and disclosed in copending U.S. patent application Ser. No. 18,174, Mar. 7, 1979 by A. Tanimoto et al, assigned to the assignee of this application and R. W. Lester U.S. Pat. No. 3,998,045, TALKING SOLID STATE TIMEPIECE.

A hold circuit VL stores and holds the output state of the converter CO and provides its output for an output selection gate OG for selection of taps on an output resistor R. Any of the output lines d, e and f within the hold circuit VL may rise to a high signal level and hold this condition until a new change comes. In this instance, it does not matter that the hold circuit VL remains in the same condition even after the completion of the delivery of a sequence of the audible ouputs indicative of the updated time, since the audible output control circuit VC provides no longer its output after the delivery of the audible outputs. The hold circuit VL may be designed to be enabled only for a limited period of time covering the interval of time in which the audible outputs are delivered.

The audible signals via the output selection gate OG are properly amplified with an audio amplifier $AM_3$ and externally released from a load speaker SP.

With the above described arrangement, when it is desired to know time, actuation of any time recall keys $VK_1$-$VK_3$ of the transmitter 1 permits the updated time information to be delivered from the timepiece body 2. Since the actuation of the time recall keys $VK_1$-$VK_3$ may select the volume of the resulting audible outputs as well in the illustrated embodiment (for instance, the key $VK_1$ selects a highest volume of sounds, the key $VK_2$ selects an intermediate volume of sounds and the key $VK_3$ selects a lowest volume of sounds), an appropriate volume of audible sounds is readily available irrespective of the magnitude of noise from the surroundings and the distance from the timepiece body 2.

Although the illustrated embodiment utilizes light communication, it is possible to rely upon ultrasonic sound, electromagnetic wave and like in practice of the present invention.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A wireless speech synthesizer timepiece for developing audible sounds indicative of updated time information, comprising:

transmitting means for transmitting a signal having a particular frequency, said transmitting means including, a plurality of volume selection key means for selecting a volume of said audible sounds and for energizing said wireless speech synthesizer timepiece to develop said audible sounds indicative of said updated time information in response to actuation thereof;

means connected to said volume selection key means for developing output signals having a plurality of different frequencies, each of the different frequencies of the output signals corresponding to one of the plurality of volume selection key means, and means responsive to one of the output signals from the developing means for transmitting a signal having a frequency corresponding to the frequency of the output signal from the means for developing;

receiver means unattached to and remote from said transmitting means for receiving said signal from the means for transmitting and for developing said audible sounds in response thereto, the audible sounds having a volume corresponding to the frequency of the received signal, said receiver means including, sensing means for sensing the presence of the signal transmitted by the means for transmitting and developing an output signal indicative thereof, amplifying means connected to the sensing means for amplifying said output signal from the sensing means, tuned circuit means connected to the amplifying means for developing a plurality of frequency signals tuned to the output signal from the sensing means, each of the frequency signals corresponding to one of the plurality of volume selection key means, timekeeping means for developing an output signal indicative of said updated time information, means responsive to one of said plurality of frequency signals from said tuned circuit means and connected to said timekeeping means for enabling the transfer of said updated time information from said timekeeping means to an output terminal, audible output control circuit means connected to said output terminal of the means for enabling for developing a sequence of audible signals indicative of said updated time information transferred from said timekeeping means, a plurality of series connected resistors connected to an output terminal of said audible output control circuit means, said resistors having taps interposed therebetween, circuit means connected to each of said taps and responsive to the plurality of frequency signals from the tuned circuit means for selecting one of said taps corresponding to the received frequency signal from the tuned circuit means, the selected tap defining a resistance including one or more of said plurality of series connected resistors, the sequence of audible signals from the audible output control circuit means passing through said resistance thereby defining a voltage of a certain magnitude, the magnitude of the voltage defining the volume of the audible sounds developed by the speech synthesizer timepiece, amplifying means connected to said circuit means for amplifying said voltage, and speaker means responsive to the amplified voltage for developing said audible sounds having a selected volume indicative of said updated time information.

* * * * *

UNITED STATES PATENT AND TRADEMARK OFFICE
CERTIFICATE OF CORRECTION

PATENT NO. : 4,334,298

DATED : June 8, 1982

INVENTOR(S) : Asada et al

It is certified that error appears in the above—identified patent and that said Letters Patent is hereby corrected as shown below:

On the title page, "[75] Inventor:" change "Atsushi Asada, Nara, Japan" to --Atsushi Asada and Kosuke Nishimura, both of Nara, Japan--

Signed and Sealed this

*Second* Day of *November 1982*

[SEAL]

*Attest:*

GERALD J. MOSSINGHOFF

*Attesting Officer* *Commissioner of Patents and Trademarks*